United States Patent
Lim et al.

(10) Patent No.: US 10,262,221 B2
(45) Date of Patent: Apr. 16, 2019

(54) EVENT SEARCHING APPARATUS AND SYSTEM

(71) Applicant: Hanwha Techwin Co., Ltd., Changwon-si (KR)

(72) Inventors: Jeong Eun Lim, Changwon-si (KR); Seung In Noh, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 0 days.

(21) Appl. No.: 15/368,105

(22) Filed: Dec. 2, 2016

(65) Prior Publication Data

US 2018/0053064 A1  Feb. 22, 2018

(30) Foreign Application Priority Data

Aug. 17, 2016  (KR) ........................ 10-2016-0104114

(51) Int. Cl.
*G06K 9/20* (2006.01)
*G06K 9/00* (2006.01)
*H04N 7/18* (2006.01)
*G06F 17/30* (2006.01)
*G06F 16/44* (2019.01)
*G06F 16/50* (2019.01)

(52) U.S. Cl.
CPC ......... *G06K 9/2081* (2013.01); *G06F 16/444* (2019.01); *G06F 16/447* (2019.01);
(Continued)

(58) Field of Classification Search
CPC .... G06K 9/20; G06K 9/2081; G06K 9/00624; G06K 9/00791; H04N 7/183;
(Continued)

(56) References Cited

U.S. PATENT DOCUMENTS 7,460,149 B1  12/2008  Donovan et al.
9,201,900 B2  12/2015  Tai
(Continued)

FOREIGN PATENT DOCUMENTS

KR  10-0999655 B1  12/2010

OTHER PUBLICATIONS

Arun Hampapur et al., "Searching Surveillance Video", 2007 IEEE Conference on Advanced Video and Signal Based Surveillance, AVSS 2007, Sep. 2007, XP055321785 (6 Pages Total).
(Continued)

*Primary Examiner* — Bobbak Safaipour
(74) *Attorney, Agent, or Firm* — Ladas & Parry LLP

(57) ABSTRACT

The present invention relates to an event searching apparatus comprising: a communication interface configured to receive, from a camera, a plurality of image frames obtained by photographing a surveillance region and metadata comprising time information of occurrence of an event and location information regarding a location of the occurrence of the event; a search map generator configured to generate a search map corresponding to the image frames and comprising a plurality of blocks; a time stamp setter configured to set at least one time stamp comprising the time information in at least one block, corresponding to the location information; a user interface configured to receive a search location as a search condition for an event search in the surveillance region; and an event searcher configured to search for and find a time stamp included in a block near the search location among the blocks, and perform event search using metadata regarding an image frame indicated by the found time stamp.

19 Claims, 8 Drawing Sheets

(52) U.S. Cl.
CPC ......... *G06F 16/50* (2019.01); *G06K 9/00771*
(2013.01); *H04N 7/183* (2013.01)

(58) Field of Classification Search
CPC .. H04N 7/18–7/188; G08B 13/196–13/19697;
G06T 2207/30221–2207/30236
See application file for complete search history.

(56) References Cited

U.S. PATENT DOCUMENTS

| | | | |
|---|---|---|---|
| 2006/0078047 A1* | 4/2006 | Shu ................... | G06F 17/3079 |
| | | | 375/240.01 |
| 2012/0106791 A1* | 5/2012 | Lim ................... | G06K 9/00771 |
| | | | 382/103 |
| 2013/0129307 A1 | 5/2013 | Choe et al. | |
| 2014/0161314 A1* | 6/2014 | Ostrovsky-Berman ..................... | |
| | | | G06F 17/30864 |
| | | | 382/103 |
| 2014/0355823 A1 | 12/2014 | Kwon et al. | |
| 2018/0025231 A1* | 1/2018 | Noh ................... | G06K 9/00718 |
| | | | 382/160 |
| 2018/0081908 A1* | 3/2018 | Matsubara .............. | G06T 7/248 |
| 2018/0322197 A1* | 11/2018 | Hesterman ........ | G06F 17/30817 |
| 2018/0357317 A1* | 12/2018 | Santiago ........... | G06F 17/30864 |

OTHER PUBLICATIONS

Communication dated Jul. 19, 2017, from the European Patent Office in counterpart European Application No. 17152738.5.

* cited by examiner

```
ff->utc = 1457338735;
ff->numObj = 1;
ff->obj[0].objID = 2;
ff->obj[0].left = -0.188661;
ff->obj[0].right = -0.112414;
ff->obj[0].top = -0.228162;
ff->obj[0].bottom = -0.074316;
```

51

111

113

EVENT SEARCHING APPARATUS AND SYSTEM

CROSS-REFERENCE TO THE RELATED APPLICATION

This application claims priority from Korean Patent Application No. 10-2016-0104114, filed on Aug. 17, 2016, and all the benefits accruing therefrom under 35 U.S.C. § 119, the disclosure of which is incorporated herein by reference in its entirety.

BACKGROUND

1. Field

Apparatuses and methods consistent with exemplary embodiments relate to event searching, and more particularly, to event searching apparatus and system which designates a region that a user wishes to search after occurrence of a particular event as a target search region and returns only events that have occurred in the target search region as search results.

2. Description of the Related Art

Surveillance systems have been widely used in various locations such as banks, department stores, and residential areas. Surveillance systems can be used mostly for crime prevention and security purposes, but have also been commonly used for monitoring pets or kids indoors in real time. One of the most common-types of surveillance systems is a closed circuit television (CCTV) system in which cameras are installed at appropriate locations where images of a region of interest can be captured and users are allowed to monitor the region of interest based on images captured by the cameras.

Recent CCTV systems provide an event search function. The term "event" encompasses various events that may occur during photographing of a particular region by a camera. Examples of an event include a motion event such as a movement of a person or an animal, a motion/sound event such as a motion and sound of a glass cup dropped from a cupboard hitting the ground and then breaking, and a heat/light event such as a fire. Recent CCTV systems are connected to various sensors, and thus, provide an event notification function, i.e., sensing occurrence of a particular event with the sensors and notifying users of the occurrence of the particular event.

However, users may often wish to check details of previous events. For example, users may wish to monitor what event has occurred after coming home to find a broken vase in their living room. Conventionally, users can only input a time condition to search previous events.

Even if a location condition is allowed to be entered, users can only set a region of interest (ROI) first and then search previous events that occurred only in the ROI, rather than being allowed to enter any desired location condition after the occurrence of a particular event. Thus, there is a demand that a location condition is entered later as a search condition in order to search events that have occurred in any particular location.

SUMMARY

Exemplary embodiments of the inventive concept provide an event searching apparatus and system, which can designate a region that a user wishes to search after occurrence of a particular event as a target search region and can return only events that have occurred in the target search region as search results.

According to an exemplary embodiment, an event search can be conducted even for multiple dates either independently or simultaneously.

However, the inventive concept is not restricted to those exemplary embodiments set forth herein. The above and other exemplary embodiments will become more apparent to one of ordinary skill in the art to which the inventive concept pertains by referencing the detailed description of the present disclosure given below.

BRIEF DESCRIPTION OF THE DRAWINGS

The above and other aspects and features of the exemplary embodiments will become more apparent by with reference to the attached drawings, in which.

DETAILED DESCRIPTION

The inventive concept will now be described more fully hereinafter with reference to the accompanying drawings, in which exemplary embodiments of the inventive concept are shown. This inventive concept may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the description of the exemplary embodiments. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
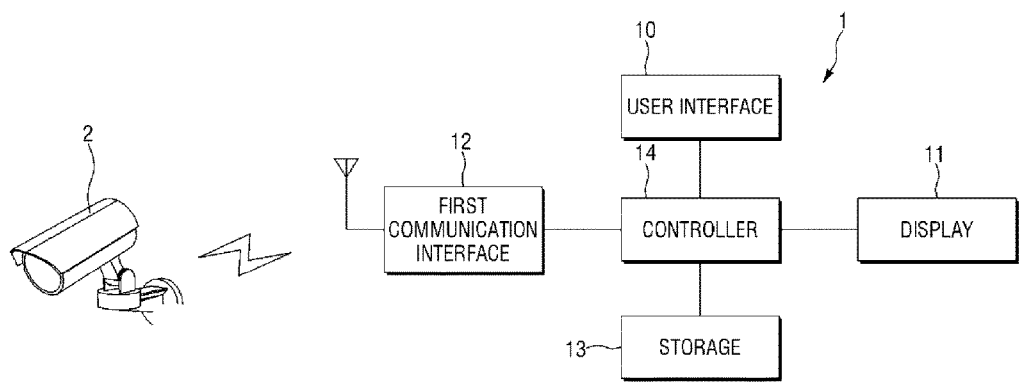
FIG. 1 is a block diagram of an event searching system according to an exemplary embodiment.

FIG. 1 is a block diagram of an event searching system according to an exemplary embodiment.

The event searching system includes a camera 2, which acquires an image 111, exemplified in FIG. 5 as described later, by photographing a surveillance region, and an event searching apparatus 1, which receives and displays the image 111 acquired by the camera 2 and allows a user to perform an event search. The camera 2 may be connected to the event searching apparatus 1 in a wired or wireless manner, or may be installed in the event searching apparatus 1 to exchange image data or signals with each other.

The image 111 acquired by the camera 2 is displayed via a display 11 of the event searching apparatus 1. The user may designate a desired search location via a user interface. Then, records of at least one event that has occurred at or near the search location are returned as search results. The event searching apparatus 1 can simply search for metadata 4, exemplified in FIG. 6 as described later, generated in advance regarding the event that has already occurred, and thus, can quickly output a search result without a need to search for the image 111 of the event.

The camera 2 acquires the image 111 by photographing the surveillance region. The camera 2 may preferably, but not necessarily, be a pan tilt camera capable of panning and tilting. Alternatively, the camera 2 may include a wide angle lens having a large angle of view, particularly, an ultra-wide-angle lens having an angle of view of at least 180°, such as a fish-eye lens. Alternatively, the camera 2 may be a 360° camera which is a camera that cannot be physically panned or tilted but is equipped with multiple fish-eye lenses, and thus, can capture 360° imagery. However, the camera 2 is not particularly limited to these examples, and various cameras may be used as the camera 2.

The camera 2 may preferably be, but is not limited to, a digital camera outputting video data by capturing 15 to 30 2-dimensional (2D) image frames per second and digitalizing the image frames. In a case where the camera 2 is not a digital camera, the image 111 acquired by the camera 2 may be red-green-blue (RGB) analog image data, and thus, an analog-to-digital converter (ADC) may additionally be needed. However, in a case where the camera 2 is a digital camera, no ADC is needed. The camera 2 may be equipped with an encoding function. Thus, the camera 2 may generate compressed or encoded image data by readily encoding the image 111 as soon as the image 111 is acquired.

The image 111 acquired by the camera 2 is transmitted to the event searching apparatus 1 via wired or wireless communication, and is then displayed by the display 11 embedded in the event searching apparatus 1. If the camera 2 is installed in the event searching apparatus 1, the image 111 acquired by the camera 2 may be transmitted to the display 11 via internal circuitry, rather than via wireless communication, and may be displayed in the display 11. The display 11 may be a liquid crystal display (LCD), a light emitting diode (LED) display, an organic LED (OLED) display, an active-matrix OLED (AMOLED) display, or a flexible display, or may be other various types of display.

The event searching apparatus 1 receives and displays the image 111 acquired by the camera 2. Also, the event searching apparatus 1 receives a user input and performs an event search. The event searching apparatus 1 may be, but is not limited to, a device such as a smartphone, a tablet personal computer (PC), a laptop computer, or the like that can be easily carried and transported. Alternatively, the event searching apparatus 1 may be, but is not limited to, a device such as a desktop computer, a video wall, or the like that cannot be easily moved.

As illustrated in FIG. 1, the event searching apparatus 1 includes the display 11 which displays the image 111, a first communication interface 12 which receives the image 111 and data from the camera 2, a storage 13 which stores the image 111, and a controller 14 which controls the other elements of the event searching apparatus 1. The event searching apparatus 1 may also include a user interface 10 through which a user input or command, such as an event search command, is received.

The display 11 displays the image 111 acquired by the camera 2. The image 111 may be a real-time image captured in real time by the camera 2 or may be an image previously acquired by the camera 2, stored in the storage 13, and displayed by being loaded from the storage 13. The event searching apparatus 1 may not provide a touch function, in which case, an input unit may be additionally provided. Examples of the input unit include a mouse, a keyboard, a joystick, a remote control, and the like. In a case where the event searching apparatus 1 provides a touch function, the display 11 may include a touch sensor capable of sensing a touch input. A touch input may be made by a finger, but the present disclosure is not limited thereto. That is, alternatively, a stylus pen equipped with a tip that can flow a minute current may be used to generate a touch input. The user may enter a command by directly touching on a graphic user interface (GUI) displayed on the display 11. Even if the event searching apparatus 1 provides a touch function, a touch pad may be additionally provided if the display 11 does not have any touch sensor. That is, the user may enter a user command to the event searching apparatus 1 via various user interfaces.

The first communication interface 12 transmits signals and data to and receives signals and data from the camera 2 in a wired or wireless manner. For example, the first communication interface 12 performs modulation and frequency up-conversion on signals and data received from the controller 12 and transmits the resulting signals and data to the camera 2, and performs frequency down-conversion and demodulation on signals and data received from the camera 2 and provides the resulting signals and data to the controller 14. In this manner, the first communication interface 12 may receive signals and data from the camera 2, and transmit signals and data generated by the controller 14 to the camera 2.

The storage 13 stores programs for processing and controlling operations performed by the event searching apparatus 1, various data generated in a process of executing each of the programs, and image data acquired by the camera 2. More specifically, the storage 13 stores the metadata 4 transmitted to the controller 14, and a search map 5, exemplified in FIGS. 7, 9, 11 and 13 as described later, generated by the controller 14. In response to the user performing an event search, the storage 13 loads the search map 5 and transmits the loaded search map 5 to the controller 14. The storage 13 may be, but is not limited to, a non-volatile memory (such as a flash memory) embedded in the event searching apparatus 1. Alternatively, the storage 13 may be provided as, but is not limited to, an element separate from the event searching apparatus 1 such as a network video recorder (NVR). Still alternatively, an NVR may be provided as the event searching apparatus 1, and a storage function may be provided in various manners, for example, using a server such as a cloud service as a storage device.

The controller 14 controls general operations of the event searching apparatus 1. For example, the controller 14 performs processing and control for the communication of signals and data between the first communication interface 13 and the camera 2, and performs image processing such as decoding and rendering on the image 111 in response to the image 111 being received via the first communication interface 13. Also, the controller 14 analyzes the metadata 4 transmitted from the camera 2. Also, the controller 14 sets a time stamp 51, exemplified in FIGS. 7, 9, 11 and 13 as described later, in the search map 5 by using the metadata 4, and performs an event search by loading the search map 5 from the storage 13 in response to an event search command being received from the user. Also, the controller 14 processes search results and controls the display 11 to display the processed search results. A central processing unit (CPU), a micro controller unit (MCU), or a digital signal processor (DSP) may preferably be used as the controller 14, but the present disclosure is not limited thereto. That is, various logic operation processors other than those set forth herein may be used as the controller 14.

Figure 2:
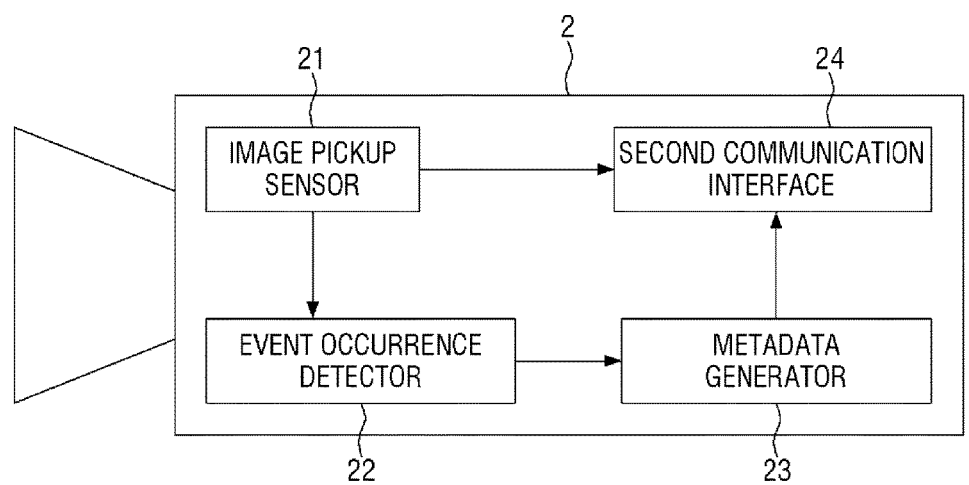
FIG. 2 is a block diagram of a camera according to an exemplary embodiment.

FIG. 2 is a block diagram of the camera 2. Referring to FIG. 2, the camera 2 includes an image pickup sensor 21 which receives an image signal, a second communication interface 24 which transmits the image 111 and data to the event searching apparatus 1, an event occurrence detector 22 which determines whether an event has occurred, and a metadata generator 23 which generates metadata 4 based on information regarding an event upon the occurrence of the event.

The image pickup sensor 21 receives an image signal regarding the surveillance region. The image pickup sensor 21 may be formed by a charge coupled device (CCD) or a complementary metal oxide semiconductor (CMOS) image sensor, not being limited thereto. In response to light being applied to a plurality of photodiodes of the CCD, the CCD accumulates electrons generated by a photoelectric effect and transmits the electrons. Then, image information, which is to form a screen image, is generated by analyzing variation of an amount of electrons generated according to an amount of photons and reconfiguring information. The CCD has advantages such as providing a clear picture quality and causing less noise and also has disadvantages such as high power consumption and low processing speed.

The CMOS image sensor, which is an image sensor using a CMOS and has an amplifier in each cell thereof, amplifies electrons generated by light into electric signals and transmits the electric signals. The CMOS image sensor is relatively cheap, consumes less power, and has high processing speed, but causes much noise.

The event occurrence detector 22 determines whether an event has occurred. In response to an event occurring, the event occurrence detector 22 may detect the occurrence of the event by analyzing the image 111 acquired by the camera 2 or by receiving a signal from a particular sensor. Alternatively, the event occurrence detector 22 may detect the occurrence of an event based on a signal received from a sensor, in which case, the sensor may include, but is not limited to, a motion sensor sensing a motion of a person or an animal, a temperature sensor sensing a variation in temperature, or a gas sensor sensing generation of a gas. That is, various types of sensors may be used as long as they can properly detect occurrence of any type of event.

More specifically, in a case where the event occurrence detector 22 detects the occurrence of an event by analyzing the image 111 acquired by the camera 2, the event occurrence detector 22 acquires an image 111 of an ordinary day in advance and detects the occurrence of an event based on any pixel value variations in the frames of the image 111 of an ordinary day, in which case, a motion of an object 3, as exemplified in FIGS. 4, 5 and 8 as described later, or the occurrence of an event such as a fire or an earthquake can be precisely detected with ease. For convenience, it is assumed that the event occurrence detector 22 detects the occurrence of an event by analyzing the image 111, but the inventive concept is not limited thereto.

In response to an event occurring, the metadata generator 23 generates the metadata 4 based on information regarding the event. The metadata 4 is data describing another particular data and identifying a type of the particular data. The metadata 4 will be described later in detail.

The second communication interface 24 in the camera 2 transmits signals and data to, and receives signals and data, from the event searching apparatus 1 in a wired or wireless manner. For example, the second communication interface 24 performs modulation and frequency up-conversion on signals and data, and transmits the resulting signals and data to the event searching apparatus 1, or performs frequency down-conversion and demodulation on signals and data received from the event searching apparatus 1. In this manner, the second communication interface 24 may receive data or signals from the event searching apparatus 1 or transmit image data, the metadata 4, or signals to the event searching apparatus 1.

Figure 3:
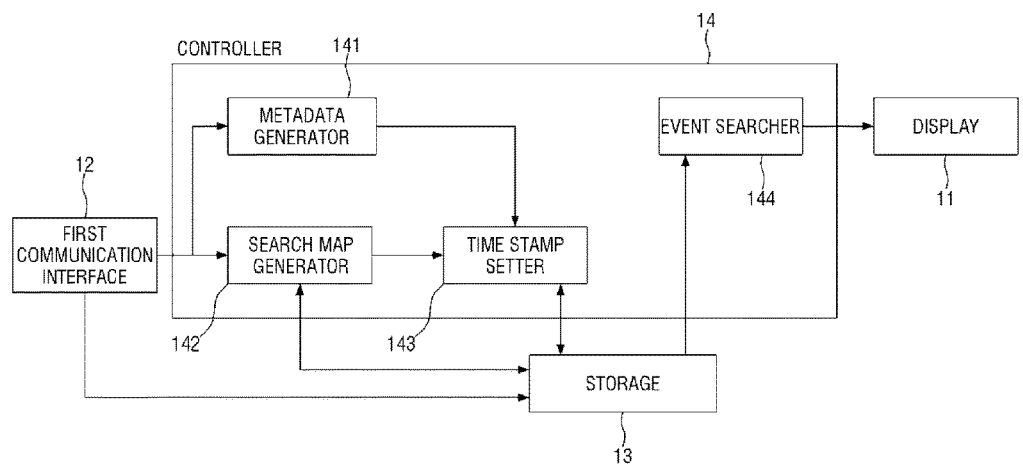
FIG. 3 is a block diagram of a controller according to an exemplary embodiment.

FIG. 3 is a block diagram of a controller 14 according to an exemplary embodiment.

Referring to FIG. 3, the controller 14 includes a metadata analyzer 141 which analyzes metadata 4, a search map generator 142 which generates the search map 5, in response to an event occurring, corresponding to the image 111 of the event through mapping the image 111, a time stamp setter 143 which sets the time stamp 51 in the search map 5, and an event searcher 144 which searches for the event in accordance with a user command.

The metadata analyzer 141 analyzes the metadata 4. The metadata 4 includes information regarding the object 3 and a location and a time of occurrence of an event. The metadata analyzer 141 extracts the information regarding the object 3 and the location and the time of the occurrence of the event by analyzing the metadata 4 and transmits the extracted information to the time stamp setter 143.

In response to the event occurring, the search map generator 142 generates the search map 5 corresponding to the image 111 through mapping the image 111. In response to the metadata 4 being transmitted from the camera 2, the search map generator 142 recognizes receipt of the metadata 4 and determines whether there is the search map 5 already generated and stored in the storage 13. If there is the search map 5 already generated and stored in the storage 13, there is no need to generate the search map 5. On the other hand, if there is no search map 5 present in the storage 13, the search map generator 142 generates the search map 5.

The search map 5 is a space where the time stamp 51 can be set at the location of the occurrence of the event through mapping the image 111. In response to a user designating search conditions for an event search, the event searcher 144 searches for the time stamp 51 set in the search map 5, and thus, can quickly output a desired search result. In other words, the search map 5 is a type of search tool for entering bibliographic data all together in advance and allowing all events to be searched simply by searching the search map 5.

The search map 5 is a space created by the event searching apparatus 1 to facilitate an event search. Thus, the search map 5 may not necessarily be a space or map that physically exists or a space or map that can be displayed via the display 11, and thus, can be identified by the naked eye of the user, but the inventive concept is not limited thereto. However, alternatively, the search map 5 can be physically displayed via the display 11 in accordance with a user command.

The search map 5 corresponds to the image 111. Thus, in response to the image 111, which is displayed via the display 11, being rectangular, the search map 5 may also be rectangular. An aspect ratio of the image 111 may preferably but not necessarily be the same as an aspect ratio of the search map 5. However, since the search map 5 only needs to correspond to time and coordinate data of the image 111, changes in a resolution, frames per second (FPS), and a bitrate of the search map 5 do not affect the search map 5. That is, even if the resolution, the FPS, and the bitrate of the search map 5 change, an event search using the search map 5 is not affected. The search map 5 may be divided into a plurality of blocks having a predetermined size. The blocks may be a standard for a location condition when the event searcher 144 performs an event search. In response to the event occurring, the search map generator 142 generates the search map 5 corresponding to the image 111 through mapping the image 111. In response to the metadata 4 being transmitted from the camera 2, the search map generator 142 recognizes receipt of the metadata 4 and determines whether there is the search map 5 already generated and stored in the storage 13. Also, the controller 14 sets a time stamp 51 in the search map 5 by using the metadata 4, and performs an event search by loading the search map 5 from the storage 13 in response to an event search command being received from the user (to DELETE).

The time stamp setter 143 sets the time stamp 51 in the search map 5. In response to the metadata analyzer 141 transmitting information included in the metadata 4 to the time stamp setter 143, the time stamp setter 143 sets the time stamp 51 in the search map 5 based on the information transmitted by the metadata analyzer 141. The setting of the time stamp 51 in the search map 5 will be described later in detail.

The event searcher 144 searches previous events in accordance with a user command. The user designates search conditions for an event search such as a time condition and a location condition. The event searcher 144 searches for the time stamp 51 from the search map 5, and thus, can quickly output a search result that matches the search conditions designated by the user. More specifically, by searching for and finding the time stamp 51 that matches the search conditions designated by the user, the metadata 4 corresponding to the found time stamp 51 can be acquired. Then, image data corresponding to the acquired metadata 4 can be loaded from the storage 13, and the loaded image data can be displayed via the display 11.

Figure 4:
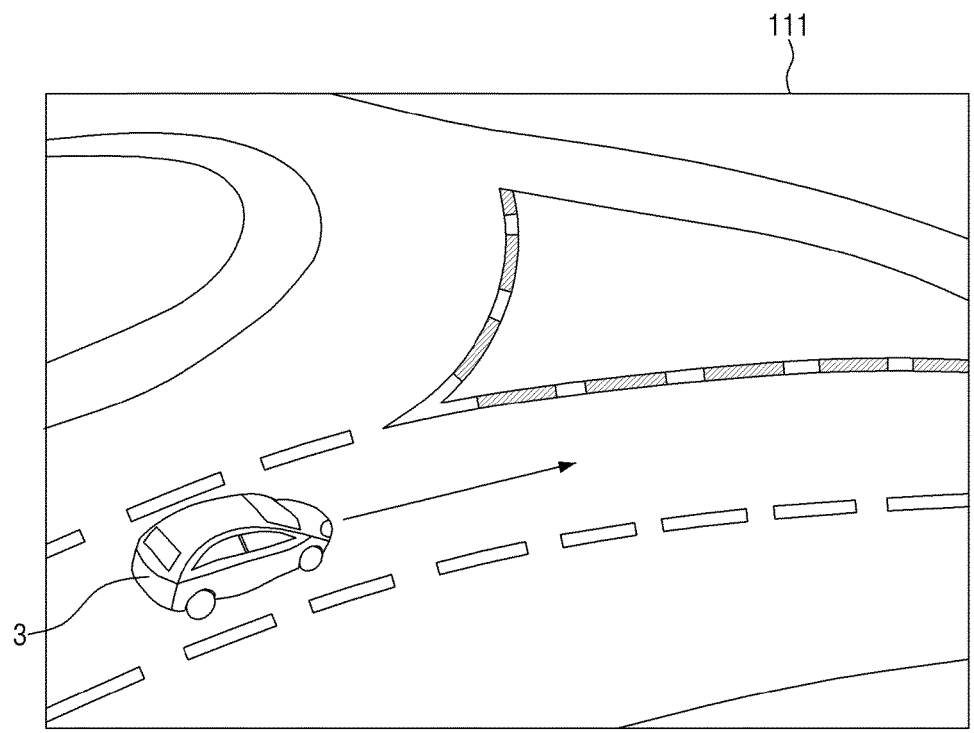
FIG. 4 is a schematic view illustrating detection of occurrence of an event from an image acquired by a camera, according to an exemplary embodiment.
Figures 5, 6:
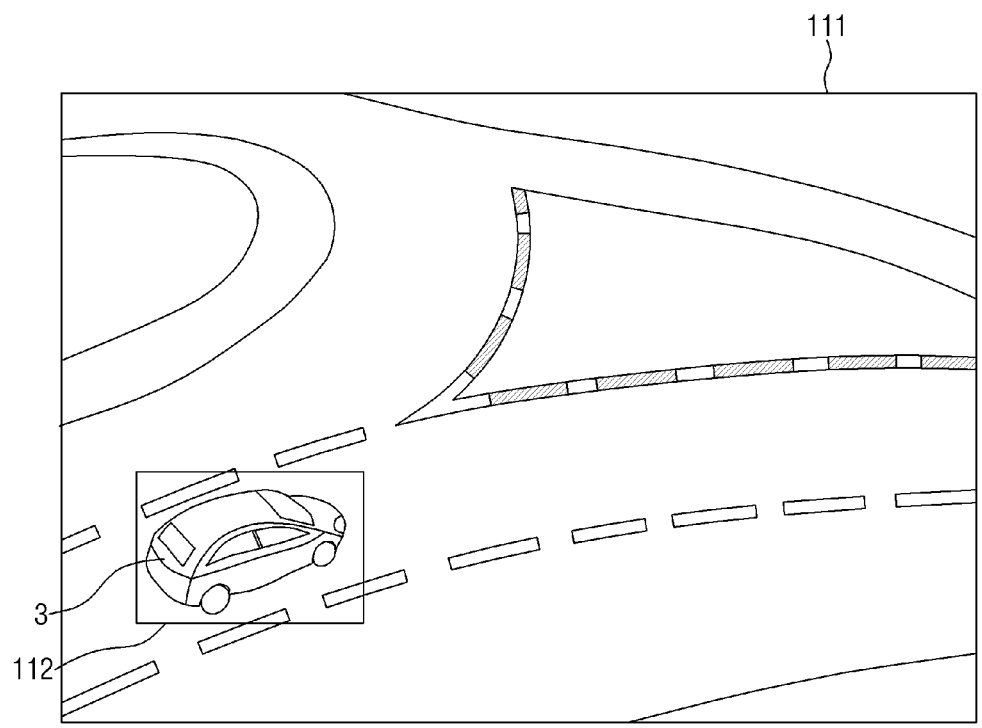
FIG. 5 is a schematic view illustrating the identification of an object causing the event of FIG. 4.
FIG. 6 shows metadata which is generated in response to an event occurring, according to an exemplary embodiment.

FIG. 4 is a schematic view illustrating detection of occurrence of an event from the image 111 acquired by the camera 2, according to an exemplary embodiment, and FIG. 5 is a schematic view illustrating the identification of the object 3 causing the event of FIG. 4, according to an exemplary embodiment.

In response to an event occurring during photographing of a surveillance region by the camera 2, the event occurrence detector 22 detects occurrence of an event. For example, referring to FIG. 4, it is assumed that the object 3, e.g., an automobile, appears as a motion event during photographing a road by the camera 2. The image pickup sensor 21 of the camera 2 acquires the image 111 by photographing the road, and the event occurrence detector 22 recognizes the occurrence of the event based on any pixel value variations in the frames of the image 111 caused by the appearance of the object 3. Then, referring to FIG. 5, the event occurrence detector 22 identifies the object 3.

Once the event occurrence detector 22 identifies the object 3, the object 3 is enclosed with a window 112. The window 112 is formed in the image 111 as a single closed curve surrounding the object 3 in the image 111 and may preferably, but not necessarily, be rectangular, as illustrated in FIG. 5.

FIG. 6 shows metadata 4 which is generated in response to an event occurring, according to an exemplary embodiment.

In response to an event occurring, the metadata generator 23 generates the metadata 4 based on information regarding the event. The metadata 4 is data describing another particular data and identifying a type of the particular data to facilitate a search for the particular data. If the particular data is data such as music data or a video that is very large in size and is not easy to be searched for, the metadata 4 may be formed of strings of text, in which case, the metadata 4 may be very small in size, and thus, may be easy to be searched for.

Referring to FIG. 6, the metadata 4 includes information such as a unique identifier (ID) of at least one object, e.g., the object 3, that is identified, the number of the identified object, a location of the identified object, and a time of occurrence of an event. More specifically, the "utc" indicates the time of the occurrence of an event, the "numObj" indicates the number of the identified object, the "obj[0].left", "obj[0].right", "obj[0].top", and "obj[0].bottom" indicate the location of the identified object, e.g., the coordinates of each vertex of the window 112 surrounding the object 3 on a two-dimensional (2D) plane, and the "obj[0].objID" indicates a unique identifier of the identified object. Even if a single object, i.e., the object 3, moves away, disappears for a while, and then reappears, the camera 2 identifies the reappeared object as being the same entity as the disappeared object and allocates the same ID as that of the disappeared object to the reappeared object. On the other hand, if the object disappears and then a new object appears, the camera 2 identifies the new object as being a different entity from the disappeared object and allocates a new ID to the new object. Thus, the event searching apparatus 1 can not only search for, but also keep track of, a particular object with ease.

Figure 7:
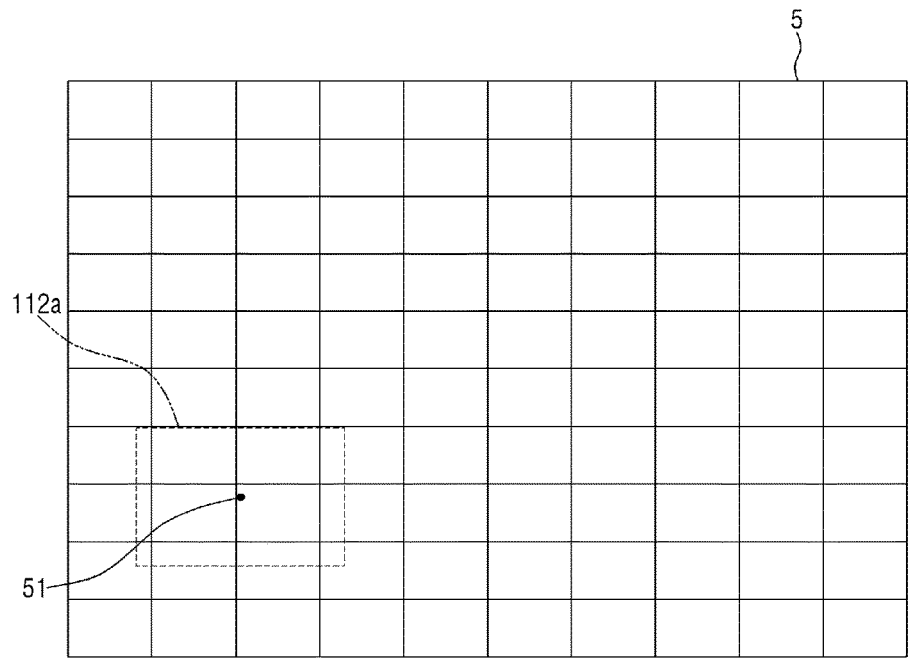
FIG. 7 is a conceptual view illustrating setting of a time stamp at a location in a search map corresponding to the location where the event of FIG. 4 has occurred, according to an exemplary embodiment.

FIG. 7 is a conceptual view illustrating setting of the time stamp 51 at a location in the search map 5, according to an exemplary embodiment, corresponding to the location where the event of FIG. 4 has occurred.

In response to the event of FIG. 4 occurring, the metadata 4 is generated. When no event occurs, there is no information to be included in the metadata 4, and there is no need to generate the metadata 4. Normally, the camera 2 transmits image data to the event searching apparatus 1. However, when an event occurs, the camera 2 transmits not only image data but also the metadata 4 to the event searching apparatus 1.

In response to the metadata 4 being received from the camera 2, the search map generator 142 recognizes the receipt of the metadata 4 and determines whether there is the search map 5 already generated and stored in the storage 13. If there is the search map 5 already generated and stored in the storage 13, there is no need to generate the search map 5. On the other hand, if there is no search map 5 stored in the storage 13, the search map generator 142 generates the search map 5 corresponding to the metadata and/or the image 111 where the event of FIG. 4 is detected through mapping the image 111. Here, the image 111 may be one or more of image frames containing the occurrence of the event.

The metadata analyzer 141 analyzes the metadata 4 and transmits information included in the metadata 4 to the time stamp setter 143. The time stamp setter 143 sets the time stamp 51 at a location in the search map 5 corresponding to the location where the event of FIG. 4 has occurred. The location where the time stamp 51 is set does not necessarily correspond exactly with the location where the event of FIG. 4 has occurred, but the time stamp 51 may preferably, but not necessarily, be set in a block of the search map 51 corresponding to the location where the event of FIG. 4 has occurred.

The time stamp 51 may be an indicator of a time when certain data is generated or modified. Referring to FIG. 7, the time stamp 51 may be set in the search map 5 to be displayed as a dot. Thus, once the time stamp 51 is set, the window 112, which surrounds the object 3 in the image 111, may be displayed in the search map 5 as a window 112a. The center of the window 112a may be designated as a location at which the time stamp 51 is to be set. Accordingly, if the object 3 appears on the road, as illustrated in FIG. 4, the time stamp 51 may be set at the center of the window 112a in the search map 5, which corresponds to the window 112 that surrounds the object 3, as illustrated in FIG. 5, but the inventive concept is not limited thereto. That is, alternatively, the time stamp 51 may be set at various other locations such as one of the four apexes of the window 112.

The time stamp 51 simply includes information regarding the time of the occurrence of an event, and the coordinates of the location in the search map 5 where the time stamp 51 is set represent the location of the occurrence of the event. Thus, the time and the location of the occurrence of an event can both be identified from the time stamp 51.

Figure 8:
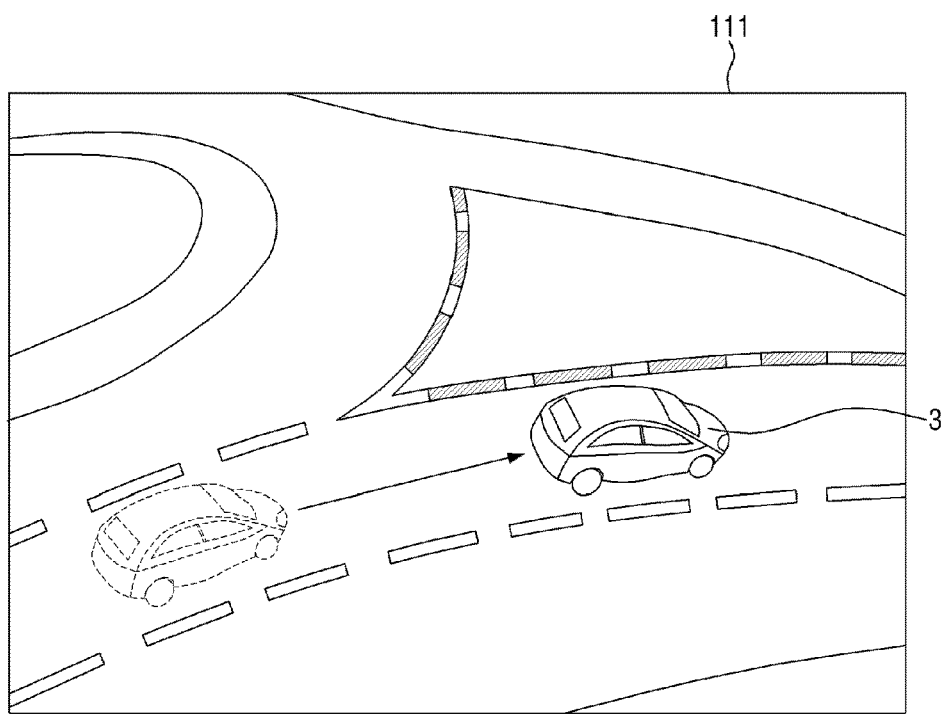
FIG. 8 is a schematic view illustrating variations in time in the event of FIG. 4, according to an exemplary embodiment.
Figure 9:
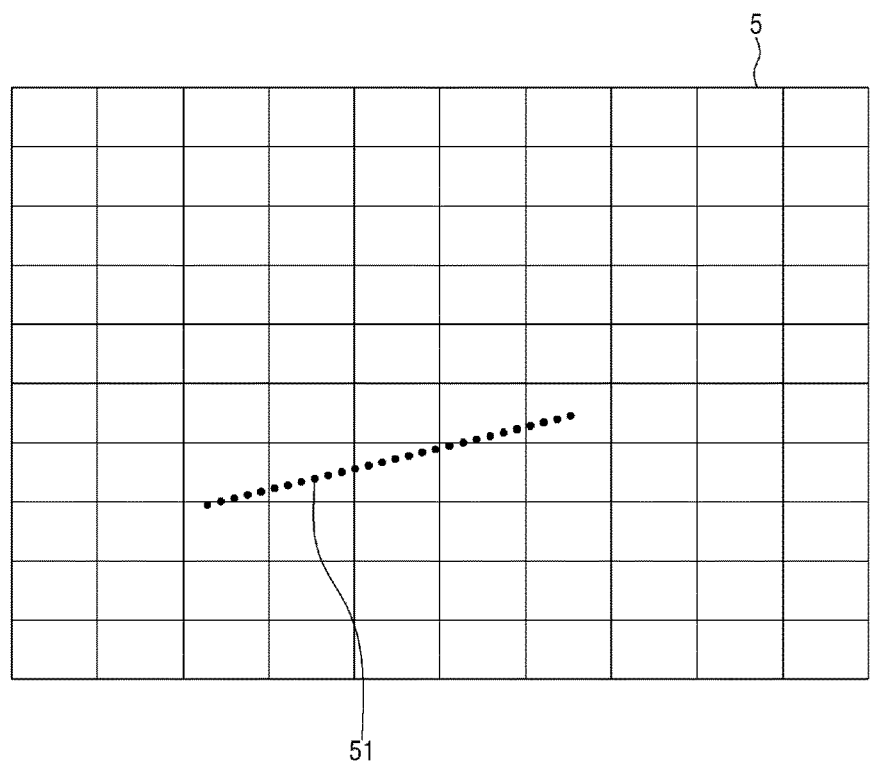
FIG. 9 is a conceptual view illustrating the setting of a plurality of time stamps at locations in a search map corresponding to the locations where the variations in time in the event of FIG. 8 are detected, according to an exemplary embodiment.

FIG. 8 is a schematic view illustrating variations in time in the event of FIG. 4, and FIG. 9 is a conceptual view illustrating the setting of a plurality of time stamps 51 at locations in a search map 5 corresponding to the locations where the variations in time in the event of FIG. 8 are detected, according to an exemplary embodiment.

An event may continue because of, for example, the object 3 continuing to move after the beginning of the event. For example, referring to FIG. 8, the object 3 may appear on the road and may then continue to move along the road, in which case, a plurality of metadata, each including the time of the occurrence of a variation in the event and the coordinates of the object 3 at the time of the occurrence of the variation in the event, are generated at regular intervals of time.

The event searching apparatus 1 receives the plurality of metadata from the camera 2, and the metadata analyzer 141 analyzes the plurality of metadata. Referring to FIG. 9, the time stamp setter 143 sets a plurality of time stamps 51 in the search map 5. A rate at which the plurality of time stamps 51 are set may preferably, but not necessarily, correspond with a rate at which the plurality of metadata are generated. For example, if ten metadata are generated at every second, ten time stamps are set in the search map 5 at every second.

The faster the rate at which the plurality of time stamps 51 are set, the greater the number of time stamps 51 set in the search map 5. Thus, the speed of an event search may decrease. In a case where multiple variations in an event occur consecutively, the plurality of time stamps 51 may be densely set. Thus, the time stamps 51 associated with the same event can be easily grouped together.

On the other hand, the slower the rate at which the plurality of time stamps 51 are set, the less the number of time stamps 51 set in the search map 5. Thus, the speed of an event search may increase. However, since the plurality of time stamps 51 are sparsely set, it may be difficult to group time stamps 51 associated with the same event. Thus, the rate at which the plurality of time stamps 51 are set may be appropriately set according to the performance of the event searching apparatus 1 and the environment in which the event searching apparatus 1 is used.

The search map 5 with the plurality of time stamps 51 set therein may be stored in the storage 13, and whenever new metadata is received, a new time stamp 51 may be set in the search map 5, thereby updating the search map 5.

Figure 10:
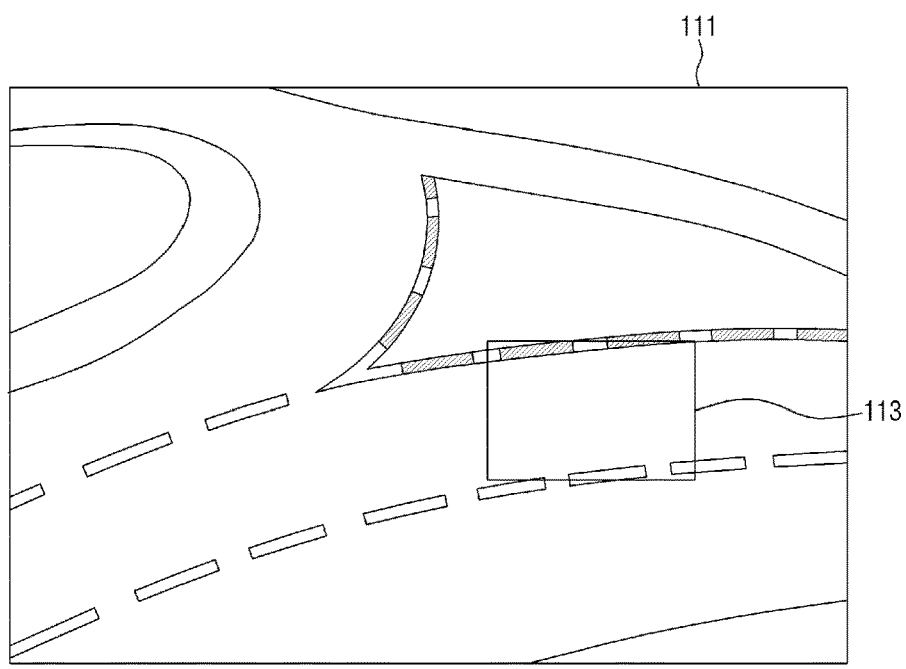
FIG. 10 is a schematic view illustrating the designation of a search region in an image as a search location, according to an exemplary embodiment.
Figure 11:
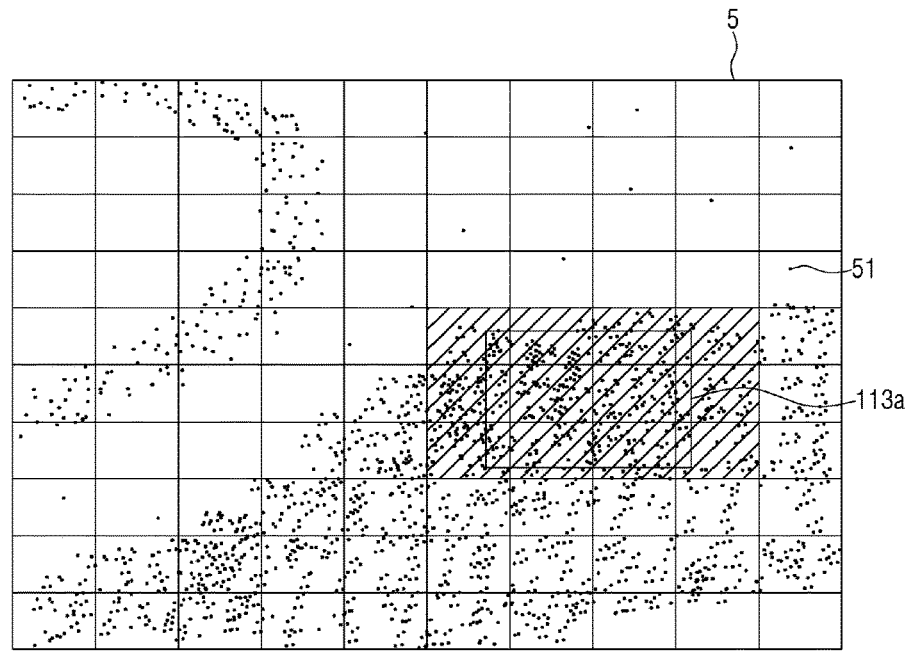
FIG. 11 is a conceptual view illustrating the designation of a region in a search map corresponding to the search region of FIG. 10, according to an exemplary embodiment.

FIG. 10 is a schematic view illustrating designation of a search region 113 in the image 111 s a search location, according to an exemplary embodiment, and FIG. 11 is a conceptual view illustrating the designation of a region in the search map 5 corresponding to the search region 113 of FIG. 10, according to an exemplary embodiment.

A user may wish to check a previous event. For example, the user may wish to monitor what event has occurred after coming home to find a broken vase in his or her living room or after finding a broken barricade on the road. In this example, the user may designate a search location in two different methods. The first method is designating the search region 113, and the second method is designating a search line 114, exemplified in FIG. 12 to be described later. The term "search location", as used herein, may denote a location condition that needs to be entered to the event searching apparatus 1 in order to perform an event search.

In a case where the user designates the search region 113 as a search location, the search region 113 may be formed in the image 111 as a single closed curve surrounding a target region to be searched, and may preferably, but not necessarily, be rectangular.

If the event searching apparatus 1 provides a touch function in order to allow a user to designate the search region 113 in the image 111, the user may touch on one apex of the target region with a finger, and may drag the finger to the opposing apex of the target region. On the other hand, if the event searching apparatus 1 allows a user command to be entered with a mouse, the user may click on one apex of the target region with a mouse and may drag the mouse to the opposing apex of the target region. However, the inventive concept is not limited to these examples. That is, the user may use various methods other than those set forth herein to designate the search region 113.

Once the search region 113 is designated in the image 111, the search region 113 is displayed in the search map 5 as a search region 113a, as illustrated in FIG. 11. As mentioned above, the search map 5 may be divided into a plurality of blocks having a predetermined size, and the event searcher 144 searches for one or more blocks having the time stamps 51 and the search region 113a set therein from the search map 5.

Figure 12:
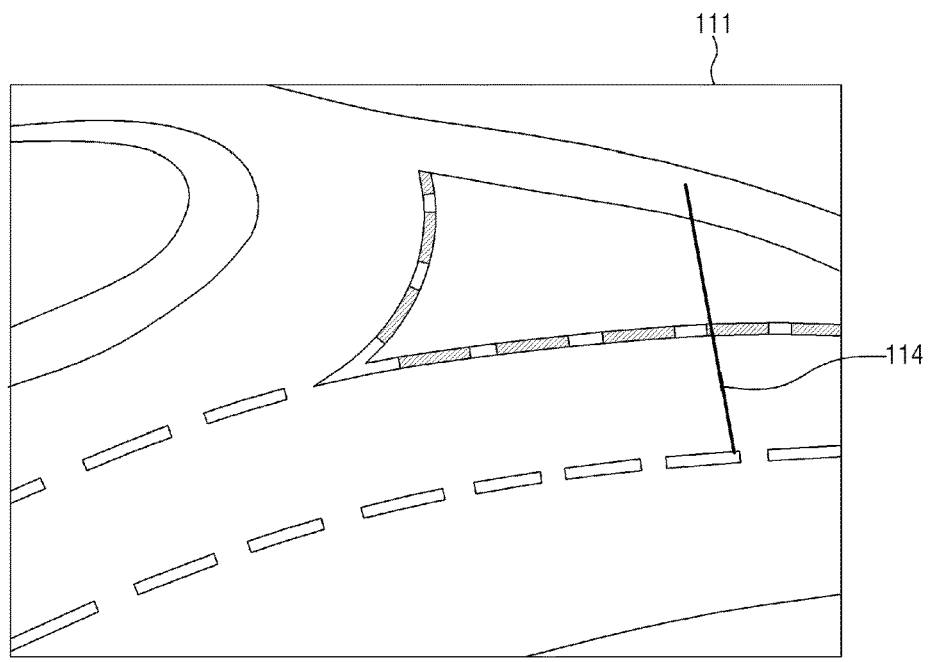
FIG. 12 is a schematic view illustrating the designation of a search line an image as a search location, according to an exemplary embodiment.
Figure 13:
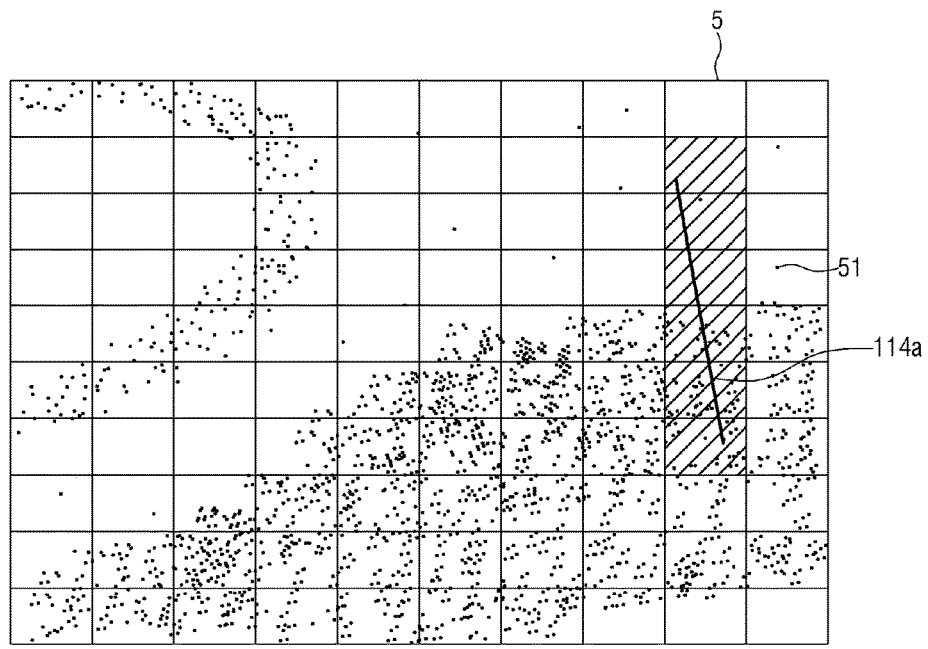
FIG. 13 is a conceptual view illustrating the designation of a line corresponding to the search line of FIG. 12 in a search map, according to an exemplary embodiment.

FIG. 12 is a schematic view illustrating the designation of the search line 114 in an image 111 as a search location, according to an exemplary embodiment, and FIG. 13 is a conceptual view illustrating the designation of a line corresponding to the search line 114 in the search map 5, according to an exemplary embodiment.

Referring to FIG. 12, in a case where the user designates the search line 114 as a search location, the search line 114 may be formed as a straight line or a curve passing through the target region.

If the event searching apparatus 1 provides a touch function in order to allow a user to designate the search line 114 in the image 111, the user may touch on a particular starting point with a finger and may drag the finger to a particular ending point to draw a line passing through the target region. On the other hand, if the event searching apparatus 1 allows a user command to be entered with a mouse, the user may click on the starting point with a mouse and may drag the mouse to the ending point to draw a line passing through the target region. However, the inventive concept is not limited to these examples. That is, the user may use various methods other than those set forth herein to designate the search line 114.

Once the search line 114 is designated in the image 111, the search line 114 is displayed in the search map 5 as a search line 114a, as illustrated in FIG. 13. As mentioned above, the event searcher 144 searches for one or more blocks having time stamps 51 and the search line 114 from the search map 5.

If the search map 5 is not divided into blocks and the event searcher 144 is configured to search for only the time stamps 51 present in the search region 113 or in contact with the search line 114, an event search may not be properly performed because of error. More specifically, since the time stamps 51 are displayed as dots and an event occurs across a region having a predetermined area, error may be inevitable. Thus, as illustrated in FIGS. 11 and 13, it may be preferable, but not necessary, to search for blocks having the time stamps 51 set therein from among the blocks including a search location therein, but the inventive concept is not limited thereto. That is, the event searcher 144 may perform an event search in various manners other than those set forth herein depending on how to set one or more time stamps, such as whether to set the multiple time stamps 51 for each event and whether to display the time stamps 51 as areas, rather than as dots.

The search map 5 may be divided into a plurality of blocks having a predetermined size. If the blocks of the search map 5 are too big in size, the error between a search location designated by the user and the location of an event returned as a search result may excessively increase. If the blocks of the search map 5 are too small in size, error may be inevitable because time stamps 51 are displayed as dots and an event occurs across a region having a predetermined area. Thus, the size of the blocks of the search map 5 may be appropriately set according to the environment in which the event searching apparatus 1 and the camera 2 are installed.

Figure 14:
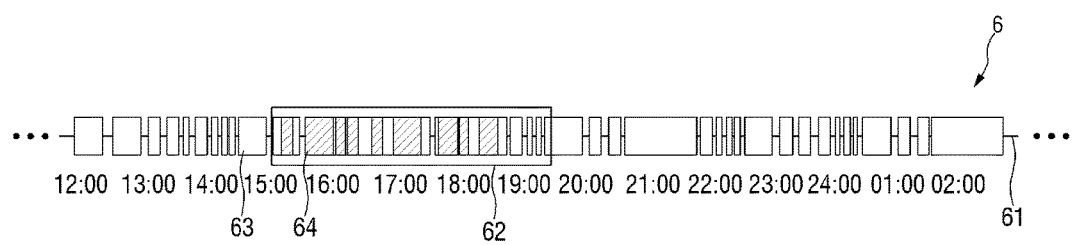
FIG. 14 is a conceptual view illustrating a time line, which conceptualizes search conditions that are entered for an event searcher to search a search map, according to an exemplary embodiment.

FIG. 14 is a conceptual view illustrating a time line 6, which conceptualizes search conditions that are entered for an event searcher 144 to search a search map 5, according to an exemplary embodiment.

The event searcher 144 searches for the time stamps 51 that match a time condition and a location condition entered by a user from the search map 5 where the time stamps 51 are set. As illustrated in FIG. 14, the event searcher 144 may determine whether the time condition and the location condition entered by the user are met. The time line 6 of FIG. 14 is not a physical entity that actually exists, but a conceptual entity representing search conditions. The time line 6 includes a line 61, which represents a flow of time, slabs 63 and 64, which indicate time periods when events occurred, and a frame 62 which represents the time and location condition entered by the user.

The frame 62, which surrounds the slab 64, corresponds to the time and location condition entered by the user. For example, the time condition entered by the user may be a time period from 3 p.m. to 7 p.m. The slabs 63 and 64 represent the time periods when the events occurred. That is, the slabs 63 and 64 represent the time periods for which the time stamps 51 are set. More specifically, the slab 63, which has no hatching, may correspond to a time period when events that do not meet the location condition entered by the user occurred. That is, the slab 63 may correspond to a time period for which the time stamps 51 are set in the search map 5, but not in blocks including the search location designated by the user therein. On the other hand, the slab 64, which has hatching, may correspond to a time period when events, that meet the location condition entered by the user, occurred. That is, the slab 64 may correspond to a time period for which the time stamps 51 are set in blocks of the search map 5 including the search location designated by the user therein. A time period not represented by a slab may be a time period when no events occurred. That is, a time period not represented by a slab may be a time period for which no time stamps 51 are set in the search map 5.

In the example of FIG. 14, the event searcher 144 returns only blocks of the search map 5 including the search location designated by the user therein and having the time stamps 51 corresponding to the time period from 3 p.m. to 7 p.m. as search results. In response to the event searcher 144 searching for and finding the time stamps 51 corresponding to the time period from 3 p.m. to 7 p.m., metadata corresponding to the found time stamps 51 may be acquired. Then, image data corresponding to the acquired metadata may be loaded from the storage 13, and the loaded image data may be output via the display 11. Accordingly, by using the time stamps 51 set in the search map 5, events desired by the user can be quickly searched for with ease.

Figure 15:
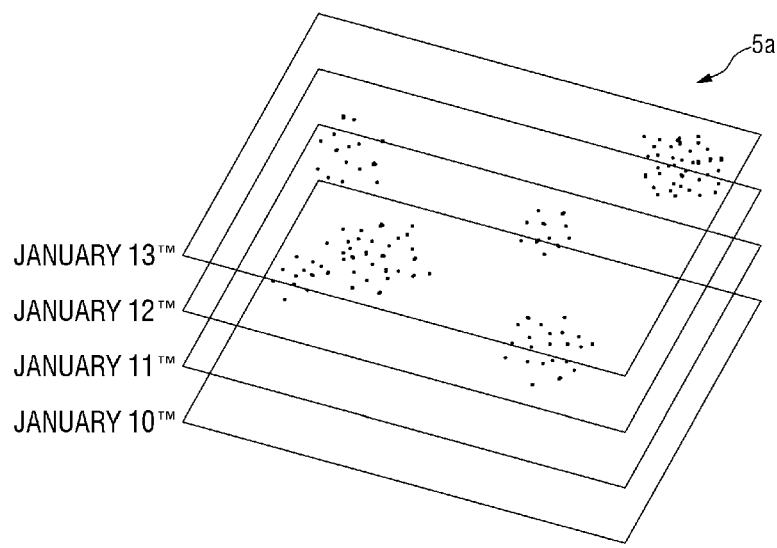
FIG. 15 is a schematic view illustrating the transformation of a search map for a case in which multiple search dates are designated, according to an exemplary embodiment.

FIG. 15 is a schematic view illustrating transformation of a search map 5 for a case in which multiple search dates are designated, according to an exemplary embodiment.

As already mentioned above, a search map is a space where a time stamp can be set at a location of occurrence of an event through mapping an image. The search map may be in the form of a 2D plane, and a time stamp is set and accumulated in the search map whenever an event occurs. The event searching apparatus 1 may preferably, but not necessarily, store image data for a short period of time such as, for example, a day or a week.

The event searching apparatus 1 may provide a function of storing image data for a long period of time such as, for example, a month or a year. In this case, however, if all time stamps are accumulated on a single plane of the search map, the speed of an event search may decrease due to an excessive amount of time stamps to search through.

Thus, in a case where the storage period of the event searching apparatus 1 is relatively long, the search map may be transformed into a three-dimensional (3D) cubic shape obtained by stacking a plurality of 2D planes. In this case, the search map may preferably, but not necessarily, accumulate time stamps corresponding to each day on each plane thereof, and a 2D plane may be stacked every day of the storage period of the event searching apparatus 1. If the storage period of the event searching apparatus 1 is a month, a total of about thirty 2D planes may be stacked. Once the storage period of the event searching apparatus 1 lapses, the stacked 2D planes may be deleted one-by-one every day, and a new 2D plane may be created every day. In this manner, a search map 5a maintains its 3D cubic shape of a predetermined size, as illustrated in FIG. 15. However, the inventive concept is not limited to this example. That is, the search map 5a may accumulate time stamps corresponding to a three-day period, a week, or another length of time on each plane thereof, and the number of planes that can be stacked may also vary.

Figure 16:
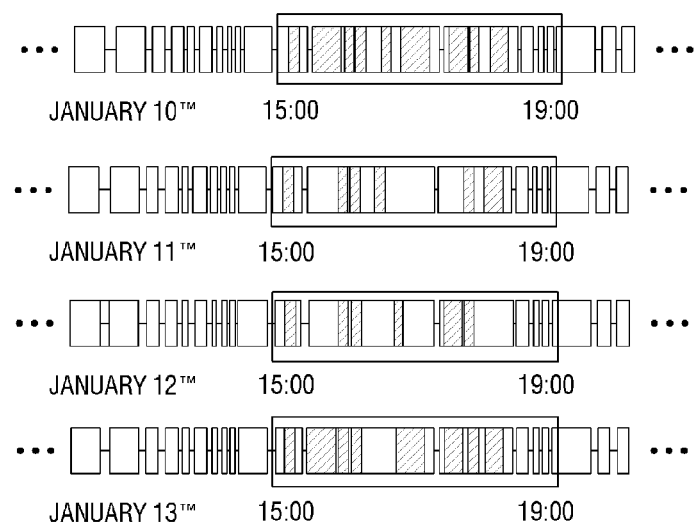
FIG. 16 is a conceptual view illustrating time lines, which conceptualize search conditions for an event searcher to search a search map, for a case in which multiple search dates are designated, according to an exemplary embodiment.

FIG. 16 is a conceptual view illustrating time lines, which conceptualize search conditions for an event searcher 144 to search a search map 5, for a case in which multiple search dates are designated, according to an exemplary embodiment.

A time condition designated by a user includes a date condition. If multiple dates are designated as a search condition, the event searcher 144 simultaneously searches planes of the search map 5a in parallel and returns only blocks of the search map 5a including a search location designated by the user therein and having time stamps set therein as search results.

For example, referring to FIG. 16, a time condition entered by the user may be a time period from 3 p.m. to 7 p.m. on each day from January $10^{th}$ to January $13^{th}$. The event searcher 144 may search for and find blocks of the search map 5a including a search location designated by the user therein and having time stamps set therein from four planes of the search map 5a corresponding to the four days, respectively, and may return the found blocks as search results. In this example, the event searcher may simultaneously search the four planes of the search map 5a corresponding to the four days, respectively, in parallel. Then, as already mentioned above, metadata corresponding to the time stamps of the found blocks may be acquired. Then, image data corresponding to the acquired metadata may be loaded from the storage 13, and the loaded image data may be output via the display 11. Accordingly, by using the time stamps set in the search map 5a, events desired by the user can be quickly searched for with ease.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

Certain components, elements, modules or units represented by a block as illustrated in FIGS. 1-3 may be embodied as various numbers of hardware, software and/or firmware structures that execute respective functions described above, according to an exemplary embodiment. For example, these components, elements, modules or units may use a direct circuit structure, such as a memory, a processor, a logic circuit, a look-up table, etc. that may execute the respective functions through controls of one or more microprocessors or other control apparatuses. Also, these components, elements, modules or units may be specifically embodied by a module, a program, or a part of code, which contains one or more executable instructions for performing specified logic functions, and executed by one or more microprocessors or other control apparatuses. Also, these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of these components, elements, modules or units may be performed by another of the components, elements, modules or units. Further, although a bus is not illustrated in the above block diagrams, communication between these components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like. These components, elements, modules or units may be the first communication processor 12, the second communication processor 24, the controller 14, the event occurrence detector 22, the metadata generator 23, the metadata analyzer 141, the search map generator 142, the time stamp setter 143, and the event searcher 144. Here, some of the components, elements, modules or units included in the event searching apparatus 1 may be relocated to the camera 2, or some of these components, elements, modules or units included in the camera 2 may be relocated to the event searching apparatus 1.

While the inventive concept has been particularly illustrated and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation to the inventive concept.

What is claimed is:

1. An event searching apparatus comprising:
    a first communication interface configured to receive, from a camera, a plurality of image frames obtained by photographing a surveillance region and metadata comprising time information regarding a time of occurrence of an event in the plurality of image frames and location information regarding a location of the occurrence of the event;
    a search map generator configured to generate a search map corresponding to the plurality of image frames and comprising a plurality of blocks;
    a time stamp setter configured to mark at least one time stamp comprising the time information on at least one block, corresponding to the location information, among the plurality of blocks in the search map;
    a storage configured to store the search map with the at least one time stamp;
    a user interface configured to receive a search location as a search condition for an event search in the surveillance region; and
    an event searcher configured to search for and find a time stamp included in a block among the plurality of blocks near the search location, and perform event search using metadata regarding an image frame indicated by the found time stamp,
    wherein a rate at which the at least one time stamp is marked is set according to a searching speed of the event searcher.

2. The event searching apparatus of claim 1, further comprising:
    a display configured to output a result of the event search as an image.

3. The event searching apparatus of claim 1, wherein the search location is displayed as a line or an area.

4. The event searching apparatus of claim 1, wherein the metadata received from the camera further comprises an identifier of an object causing the event, and
    wherein the location information comprises coordinates of the object on a two dimensional (2D) plane.

5. The event searching apparatus of claim 1, wherein the user interface receives a plurality of search conditions, and
    wherein the event searcher performs the event search according to the search condition or the plurality of search conditions.

6. The event searching apparatus of claim 5, wherein the search condition comprises a location condition and a time condition.

7. The event searching apparatus of claim 6, wherein if the time condition comprises multiple dates, the search map has a three-dimensional (30) cubic shape obtained by stacking a plurality of 20 planes.

8. The event searching apparatus of claim 7, wherein the event searcher performs the event search by simultaneously processing the plurality of 20 planes in parallel.

9. The event searching apparatus of claim 1, wherein the image frame indicated by the found time stamp varies depending on the search location.

10. An event searching system comprising:
    a camera configured to generate the plurality of image frames by photographing the surveillance region, and generate the metadata regarding the plurality of image frames; and
    the event searching apparatus of claim 1.

11. The event searching system of claim 10, wherein the camera comprises:
    an image pickup sensor configured to generate the plurality of image frames by photographing the surveillance region;
    an event occurrence detector configured to detect whether the event has occurred based on the plurality of image frames;
    a metadata generator configured to generate the metadata comprising the time information and the location information; and
    a second communication interface configured to transmit the plurality of image frames generated by the image pickup sensor and the metadata generated by the metadata generator to the first communication interface.

12. An event searching apparatus comprising:
    metadata generator configured to generate metadata of an event occurring in a surveillance region;
    a search map generator configured to generate search map information which comprises location information about the event, wherein the search map information comprises a search map displayed to the user, and wherein the search map is divided by a plurality of divided areas;
    a time stamp setter configured to mark at least one time stamp of the event on at least one of the plurality of divided area and correlate the at least one time stamp with the location information in the search map information, based on the metadata of the event;
    a storage configured to store the search map with the at least one time stamp; and
    an event searcher configured to search for a time stamp, corresponding to a search condition input by a user, from the search map information, extract metadata corresponding to the time stamp, and control to display an image corresponding to the extracted metadata,
    wherein a rate at which the at least one time stamp is marked is set according to a searching speed of the event searcher.

13. The event searching apparatus of claim 12, wherein the time stamp comprises time and location information about the event.

14. The event searching apparatus of claim 12, wherein the search map information comprises a search map displayed to a user, and
    wherein the event searcher is configured to allow the user to designate an area or a location for the search for the time stamp.

15. The event searching apparatus of claim 12, wherein the time stamp comprises time and location information about the event.

16. The event searching apparatus of claim 12, wherein the search map information comprises a search map displayed to a user, and
    wherein the time stamp setter sets the at least one time stamp at or near at least location of the event occurring in the search map, respectively.

17. The event searching apparatus of claim 16, wherein the search map generator generates the search map which is prestored in a storage before the event occurring in response to the generation of the metadata.

18. The event search apparatus of claim 17, wherein the time stamp comprises time and location information about the event.

19. An event searching apparatus comprising:
a first communication interface configured to receive, from a camera, a plurality of image frames obtained by photographing a surveillance region and metadata comprising time information regarding a time of occurrence of an event in the plurality of image frames and location information regarding a location of the occurrence of the event;
a search map generator configured to generate a search map corresponding to the plurality of image frames and comprising a plurality of blocks;
a time stamp setter configured to mark at least one time stamp comprising the time information on at least one block, corresponding to the location information, among the plurality of blocks in the search map, wherein the at least one time stamp is set in the search map to be displayed as a dot;
a storage configured to store the search map with the at least one time stamp;
a user interface configured to receive a search location as a search condition for an event search in the surveillance region; and
an event searcher configured to search for and find a time stamp included in a block including the search location, and perform event search using metadata regarding an image frame indicated by the found time stamp,
wherein a rate at which the at least one time stamp is marked is set according to a searching speed of the event searcher.

* * * * *